P. N. BERGGREN.
ROOF SQUARE.
APPLICATION FILED MAR. 12, 1910.
1,059,264.
Patented Apr. 15, 1913.
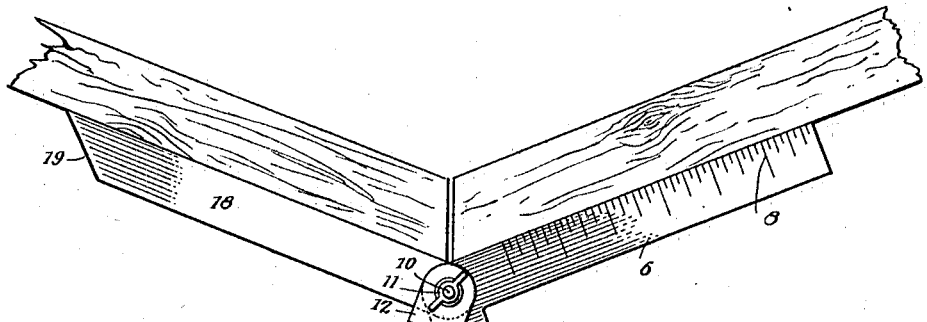
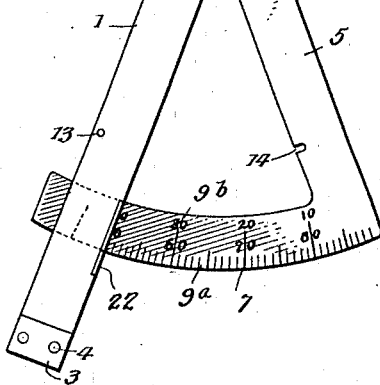
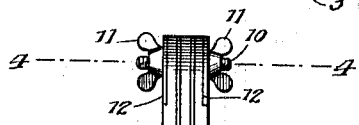
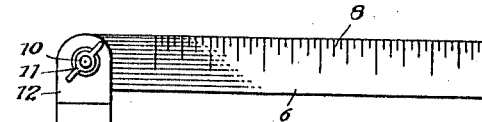
WITNESSES:
INVENTOR
PETER N. BERGGREN,
BY
ATTORNEYS

UNITED STATES PATENT OFFICE.

PETER N. BERGGREN, OF SAN JOSE, CALIFORNIA.

ROOF-SQUARE.

1,059,264.　　　　　Specification of Letters Patent.　Patented Apr. 15, 1913.

Application filed March 12, 1910. Serial No. 548,950.

*To all whom it may concern:*

Be it known that I, PETER N. BERGGREN, a citizen of the United States, and a resident of San Jose, in the county of Santa Clara and State of California, have made certain new and useful Improvements in Roof-Squares, of which the following is a specification.

My invention is an improvement in roof squares, and consists in certain novel constructions, and combination of parts, hereinafter described and claimed.

The object of the invention is to provide a square especially fitted for roof work, but equally well adapted for any work wherein an ordinary or bevel square may be used, and which will be easily manipulated to indicate the correct angle, and locked in the required position, and which when not in use may be folded into small compass.

Referring to the drawings forming a part hereof, Figure 1 is a side view of the improvement, showing the parts in a position for bevel work, Fig. 2 is a similar view showing it in use as an ordinary square, Fig. 3 is an edge view, and Fig. 4 is a section of the line 4—4 of Fig. 3.

The embodiment of the invention shown in the drawings, comprises a handle 1, which is provided at one end with a pair of parallel longitudinal slots 2 and 2ª, and the opposite end may be provided with a reinforcing ferrule 3, secured to the handle by rivets 4.

A substantially Z-shaped strip or blade is mounted in one of the slots, the said blade comprising a body portion 5 which normally fits in the slot, and is of a width corresponding to the width of the handle, and the body portion is provided at each end with a lateral extension 6 and 7 respectively.

The extensions project in opposite directions, the extension 6 being straight and extending at a right angle to the body portion, while the extension 7 is arc shaped, and the extension 6 is provided with a scale 8, and the extension 7 with a plurality of scales 9ª and 9ᵇ. A transverse opening is provided in the body portion at the junction of the extension 6 therewith, and the extension 7 is struck on the arc of a circle, whose center is the opening.

A stem 10 passes through the opening and through registering openings in the handle on each side of the slot, and the threaded ends of the stem extend on each side of the handle, and are engaged by wing nuts 11. A reinforcing plate 12 is let into each of the outer faces of the handle at the end provided with the stem, and the wing nuts 11 screw against the plates.

The swinging movement of the blade 5 is limited in one direction by a pin 13 extending through the handle, and adapted to engage a nick 14 in the edge of the blade, and the stem 10 is provided at its center with a collar 15, which fits within an opening 16 in the handle, and is retained in place on the stem by a transverse pin 17.

A second strip or blade 18 is provided at one end with an opening through which the stem 10 extends, and the said blade is received in the slot 2ª. The opposite or free end of the blade is beveled as shown at 19, and the inner end of the slot is similarly beveled as shown at 20, to fit the end of the blade, and the handle is provided with a notch 21, to permit access to the blade to open the same.

It will be evident from the description, that either blade may be moved into and out of its respective slot, and may be locked in any position which it is capable of taking, by means of the wing nut on that side. The arrangement of the collar at the center of the stem, permits either wing nut to be tightened, without interfering with the other, and one blade may be locked while the other is free.

It will be evident that many different combinations may be formed with the blades. As shown in Fig. 2, by locking the blade 5 with the extension 6 at right angles to the handle, a perfectly true square is provided, and the scale on the arc-shaped extension 7 indicates the angle of the extension 6 with respect to the handle.

The scale 9ª gives the complement of the angle between the body portion or blade 5 and the handle, while the scale 9ᵇ gives the angle between the body portion or blade and the handle. The scale 9ᵇ plus 90 degrees gives the angle between the extension and the handle. For instance, in the position shown in Fig. 1, the body portion or blade 5 is at an angle of 40 degrees with respect to the handle, and the said complement of the angle between the said blade 5 and the handle is 50 degrees. The angle between the extension 6 and the handle is 130 degrees, that is, 40 degrees plus 90 degrees.

The blade 18 may also be used in connection with the scale on the arc-shaped bar, and when the extension 7 is in the position shown in Fig. 2, the upper series of numerals will indicate the angle the said blade 18 makes with the handle, when the blade is moved thereover. It will be noticed that the arrangement of the pin 13 and nick 14 is such that the extension 6 is held at right angles to the handle, when the nick is engaged with the pin.

A plate 22 is set into one edge of the handle as shown in Fig. 1, to act as an indicator for the scale, when the handle is of soft material, such as wood. It will be understood that the handle may be of metal, however, if desired, in which case the reinforcing plates etc. will be dispensed with.

When folded the device requires but little more room than the ordinary square, and it will be evident that it may be made of any desired size.

The extension 6 may also be used in coöperation with the blade 18, as shown in Fig. 1, and the extension 7 may be used to lay off curved lines.

I claim—

1. A device of the character specified, comprising a handle having at one end two parallel longitudinal slots, a blade in each slot, a stem extending through the said end of the handle and through the blades, and having each end threaded, a wing nut engaging each end of the stem, a collar secured to the stem between the blades, the handle having an opening to receive the collar, one of said blades having a right angled lateral extension at the end adjacent to the stem, and at the other end an arc-shaped lateral extension extending in the opposite direction from the first extension, each of said extensions having a scale, the other blade having its free end beveled.

2. A device of the character specified, comprising a handle having at one end two parallel longitudinal slots, a blade in each slot, a stem extending through the said end of the handle and through the blades, and having each end threaded, a wing nut engaging each end of the stem, means intermediate the blades for anchoring the stem, one of said blades having its free end beveled, and the other having at each end a lateral extension, the extension at the free end of the blade being arc-shaped and struck on the arc of a circle whose center is the stem, the other extension being at right angles to the blade and extending in the opposite direction from the first extension.

PETER N. BERGGREN.

Witnesses:
JOHN LINDSTROM,
L. E. LINEHAN.

---

Copies of this patent may be obtained for five cents each, by addressing the "Commissioner of Patents, Washington, D. C."